United States Patent
Gibeau et al.

(10) Patent No.: US 10,391,938 B2
(45) Date of Patent: Aug. 27, 2019

(54) IMAGING SYSTEM FOR LOCATING A MOVING OBJECT IN RELATION TO ANOTHER OBJECT

(71) Applicant: Ford Global Technologies, LLC, Dearborn, MI (US)

(72) Inventors: John Paul Gibeau, Canton, MI (US); Christopher W. Bell, Livonia, MI (US); Ali Hassani, Ann Arbor, MI (US); Brad Alan Ignaczak, Canton, MI (US); Adil Nizam Siddiqui, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 14/713,537

(22) Filed: May 15, 2015

(65) Prior Publication Data
US 2016/0332572 A1    Nov. 17, 2016

(51) Int. Cl.
*B60R 1/00* (2006.01)
*G06T 11/00* (2006.01)
(Continued)

(52) U.S. Cl.
CPC ............... *B60R 1/00* (2013.01); *B60L 53/12* (2019.02); *B60L 53/37* (2019.02); *B62D 15/0275* (2013.01); *G06T 11/00* (2013.01); *B60L 2250/16* (2013.01); *B60R 2300/10* (2013.01); *B60R 2300/307* (2013.01); *B60R 2300/80* (2013.01); *B60R 2300/806* (2013.01); *Y02T 10/7005* (2013.01); *Y02T 10/7072* (2013.01); *Y02T 90/12* (2013.01); *Y02T 90/121* (2013.01);

(Continued)

(58) Field of Classification Search
None
See application file for complete search history.

(56) References Cited

U.S. PATENT DOCUMENTS

| | | | |
|---|---|---|---|
| 8,823,551 B1 * | 9/2014 | Hoffman | B60L 11/182 340/932.2 |
| 2012/0095617 A1 * | 4/2012 | Martin | B60L 11/1833 701/1 |

(Continued)

FOREIGN PATENT DOCUMENTS

| | | | |
|---|---|---|---|
| WO | 2014/082571 A1 | 6/2014 | |
| WO | WO-2015114775 A1 * | 8/2015 | ............... B60L 3/00 |

*Primary Examiner* — James M Anderson, II
(74) *Attorney, Agent, or Firm* — David Kelley; Brooks Kushman P.C.

(57) ABSTRACT

Electric and plug-in hybrid electric vehicles include a rechargeable traction battery. An automated vehicle charging system is configured to charge the traction battery with minimal operator intervention. The vehicle charging system includes at least one tire pad including a plurality of pressure-sensitive sensors arranged at known locations of the tire pad and outputting signals having a magnitude indicative of a pressure applied by a tire at the known locations. The vehicle charging system also includes at least one controller programmed to receive the signals and control movement of a transmit coil according to a position of the tire on the tire pad that is derived from the signals. The known locations may be generally equally spaced or unevenly spaced across the tire pad. The tire pad may include a tire stop to limit motion of the tire in one direction.

14 Claims, 4 Drawing Sheets

(51) Int. Cl.
  *B62D 15/02* (2006.01)
  *B60L 53/12* (2019.01)
  *B60L 53/37* (2019.01)

(52) U.S. Cl.
  CPC ............ *Y02T 90/122* (2013.01); *Y02T 90/125* (2013.01); *Y02T 90/14* (2013.01)

(56) References Cited

U.S. PATENT DOCUMENTS

| | | |
|---|---|---|
| 2012/0262002 A1 | 10/2012 | Widmer |
| 2012/0327239 A1* | 12/2012 | Inoue .................. B60R 1/00 348/148 |
| 2013/0024059 A1 | 1/2013 | Miller et al. |
| 2014/0132208 A1* | 5/2014 | Fisher .................. H02J 5/005 320/108 |
| 2014/0217966 A1 | 8/2014 | Schneider et al. |
| 2014/0232331 A1 | 8/2014 | Stamenic et al. |
| 2017/0174129 A1* | 6/2017 | Chin .................. B60R 1/00 |

* cited by examiner

IMAGING SYSTEM FOR LOCATING A MOVING OBJECT IN RELATION TO ANOTHER OBJECT

TECHNICAL FIELD

This application generally relates to imaging systems for locating a moving object in relation to another object, for example, using superimposed images to position a vehicle for charging.

BACKGROUND

Electric vehicles (EVs) and plug-in hybrid electric vehicles (PHEVs) utilize energy stored in a traction battery to provide electric-only driving range. A vehicle charging station may be used to provide energy to the traction battery. The vehicle charging station may provide an interface that couples energy from a power source to the traction battery of the vehicle. The interface may couple the energy conductively or inductively. Conductive interfaces may include a plug that is inserted into a compatible receptacle of the vehicle. The vehicle operator must typically perform a manual operation to insert the plug into the receptacle. Inductive charging systems may include a primary charging coil that is energized with an electric current. The primary charging coil induces a current in a secondary charging coil, which may be used to charge a battery.

SUMMARY

In at least one embodiment, a system for positioning a vehicle is provided. The system may include one or more cameras configured to provide an image stream of an area outside a footprint of the vehicle. The system may also include a controller configured to receive the image stream from the one or more cameras, augment the image stream with a vehicle receive coil symbol and a transmit coil symbol to generate an augmented image stream, and transmit the augmented image stream to a vehicle display.

The augmented image stream may further include a vehicle symbol representing a position of the vehicle and the vehicle receive coil symbol may be located within the vehicle symbol. In one embodiment, the vehicle receive coil symbol represents a position of a vehicle wireless energy receive coil and the transmit coil symbol represents a position of a wireless energy transmit coil. When the vehicle receive coil symbol overlaps with the transmit coil symbol in the augmented image stream, the vehicle wireless energy receive coil may be aligned to receive wireless energy from the wireless energy transmit coil. The position of the wireless energy transmit coil may be based on a position of a target detected in the image stream.

In one embodiment, a predetermined relative position between the target and the wireless energy transmit coil may be stored in memory coupled to the controller. The controller may be configured to wirelessly receive a predetermined relative position between the target and the wireless transmit coil from the wireless energy transmit coil or an enclosure thereof. The position of the wireless energy transmit coil may be based on a detection of the wireless energy transmit coil in the image stream. The position of the wireless energy transmit coil may be based on a first data set when the wireless energy transmit coil is within a field of view of the one or more cameras and a second data set when the wireless energy transmit coil is out of the field of view of the one or more cameras. The first data set may include a relative position between the vehicle and the wireless energy transmit coil based on a detection of the wireless energy transmit coil in the image stream and the second data set may include vehicle speed and direction data.

In at least one embodiment, a method of positioning a vehicle is provided. The method may include generating an image stream of an area outside a footprint of the vehicle from one or more visible-light vehicle cameras. The method may further include augmenting the image stream with a vehicle receive coil symbol and a transmit coil symbol to generate an augmented image stream. The augmented image stream may be displayed on a vehicle display.

The augmented image stream may further include a vehicle symbol representing a position of the vehicle and the vehicle receive coil symbol may be located within the vehicle symbol. The vehicle receive coil symbol may represent a position of a vehicle wireless energy receive coil and the transmit coil symbol may represent a position of a wireless energy transmit coil. The method may further include operating the vehicle such that the vehicle receive coil symbol overlaps with the transmit coil symbol in the augmented image stream. The method may include detecting a target in the image stream and basing the position of the wireless energy transmit coil on a position of the target. In one embodiment, the position of the wireless energy transmit coil is based on a predetermined relative position between the target and the wireless transmit coil. In another embodiment, the predetermined relative position is received by the vehicle from the wireless energy transmit coil or an enclosure thereof. The method may include detecting the wireless energy transmit coil in the image stream and basing the position of the wireless energy transmit coil on the detection.

In one embodiment, the method further includes basing the position of the wireless energy transmit coil on a first data set when the wireless energy transmit coil is within a field of view of the one or more cameras and a second data set when the wireless energy transmit coil is out of the field of view of the one or more cameras or obscured by other objects within the field of view. The first data set may include a relative position between the vehicle and the wireless energy transmit coil based on a detection of the wireless energy transmit coil in the image stream and the second data set may include vehicle speed and direction data.

In at least one embodiment, a system for positioning a vehicle is provided. The system may include one or more visible-light cameras configured to provide an image stream of an area outside a footprint of the vehicle and a controller. The controller may be configured to receive the image stream from the one or more cameras, augment the image stream with a vehicle receive coil positioning symbol, a transmit coil positioning symbol, and a vehicle positioning symbol to generate an augmented image stream, and transmit the augmented image stream to a vehicle display. The receive coil positioning symbol may be located within the vehicle positioning symbol.

In one embodiment, when the vehicle receive coil positioning symbol overlaps with the transmit coil positioning symbol in the augmented image stream, a vehicle wireless energy receive coil is aligned to receive wireless energy from a wireless energy transmit coil at 90% or greater of maximum charging efficiency.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
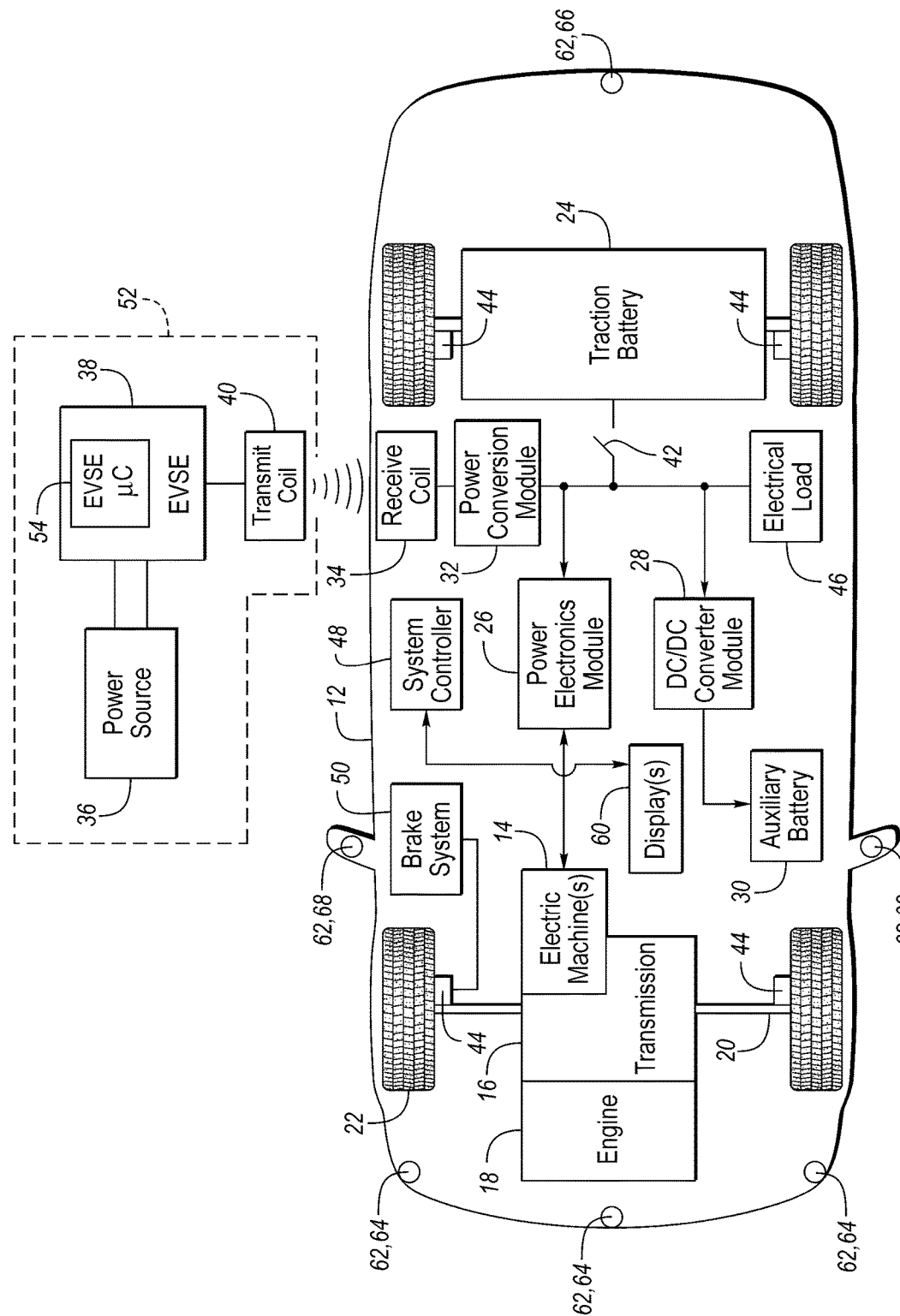
FIG. 1 is a diagram of a hybrid vehicle illustrating drivetrain and energy storage components, according to an embodiment.

FIG. 1 depicts an embodiment of a plug-in hybrid-electric vehicle (PHEV). While the vehicle described below is PHEV, the disclosed system may also be used in a purely electric vehicle or a non-plug-in hybrid-electric vehicle. Plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A fraction battery or battery pack 24 stores energy that can be used by the electric machines 14. A vehicle battery pack 24 may provide a high voltage DC output. The traction battery 24 is electrically connected to one or more power electronics modules 26. One or more contactors 42 may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a traction battery 24 may provide a DC voltage while the electric machines 14 may operate using a three-phase AC current. The power electronics module 26 may convert the DC voltage to a three-phase AC current for use by the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads 46, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be an electric vehicle or a plug-in hybrid vehicle in which the traction battery 24 may be recharged by a wireless vehicle charging system 52. The wireless vehicle charging system 52 may include an external power source 36. The external power source 36 may be a connection to an electrical outlet. The external power source 36 may be electrically connected to electric vehicle supply equipment (EVSE) 38. The EVSE 38 may provide a controller 54 to provide circuitry and controls to regulate and manage the transfer of energy between the power source 36 and the vehicle 12. The external power source 36 may provide DC or AC electric power to the EVSE 38. The EVSE 38 may be coupled to a transmit coil 40 (or primary charging coil) for wirelessly transferring energy to a receive coil 34 (or secondary coil) of the vehicle 12. The receive coil 34 may be electrically connected to a charger or on-board power conversion module 32. The receive coil 34 may be located on an underside of the vehicle 12. The power conversion module 32 may condition the power supplied to the receive coil 34 to provide the proper voltage and current levels to the traction battery 24. The power conversion module 32 may interface with the EVSE 38 to coordinate the delivery of power to the vehicle 12. The transmit coil 40 may cause the traction battery 24 to be charged by generating an electromagnetic field about the wireless vehicle charging system 52. When the corresponding receive coil 34 is placed in proximity to the wireless vehicle charging system 52, it receives power by being within the generated electromagnetic field.

One or more wheel brakes 44 may be provided for decelerating the vehicle 12 and preventing motion of the vehicle 12. The wheel brakes 44 may be hydraulically actuated, electrically actuated, or some combination thereof.

The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function. One or more electrical loads 46 may be connected to the high-voltage bus. The electrical loads 46 may have an associated controller that operates and controls the electrical loads 46 when appropriate. Examples of electrical loads 46 may be a heating module or an air-conditioning module.

The wireless vehicle charging system 52 may define an area (e.g., a parking space) for parking the vehicle 12 for charging. The area may be suitable for charging a variety of different sized vehicles. The wireless vehicle charging system 52 may provide visual feedback to a vehicle operator. The visual feedback may include one or more indicators to indicate that charging is in progress, charging is completed, or that a diagnostic condition is present that inhibits charging. The visual feedback may be part of a display that is external to the vehicle or within the vehicle. The wireless vehicle charging system 52 may communicate charging status information to the vehicle 12. An operator display 60 in the vehicle 12 may indicate the charging status information to the vehicle operator. This may eliminate the need for external indicators that may be a part of the wireless vehicle charging system 52 and reduce the footprint of the wireless vehicle charging system 52.

The vehicle 12 may include a system controller 48, which may be part of a controller area network (CAN bus), which may communicate with any or all of the other components of the vehicle 12. The system controller 48 in the vehicle 12 may monitor the charging operation. The system controller 48 may compute the amount of energy being transferred and determine if more energy transfer is possible. A predetermined nominal energy transfer amount may be known and the vehicle controller 48 may compare the present energy transfer to the nominal energy transfer. The vehicle 12 may send a signal that indicates when charging is completed. The charge controller 54 may then de-energize the transmit coil 40.

The vehicle 12 may include one or more cameras 62, which may provide images and/or video to the display 60. The display 60 may be located in a front or center console of the vehicle 12 (e.g., in addition to or as part of the entertainment or navigation systems), in the instrument panel, in a rear-view mirror (center or sides), as a heads-up display (HUD), or any other display location. In addition, there may be a plurality of displays 60 within the vehicle, and the images or video may be displayed on any or all of them. The vehicle 12 may include one or more front cameras 64, one or more rear cameras 66, and/or one or more side cameras 68. In one embodiment, the vehicle 12 may include a front camera 64, a rear camera 66, and two side cameras 68. The side cameras 68 may be located on the rear view mirrors of the vehicle 12. In this embodiment, the front and rear cameras may be centrally located or substantially centrally located, such that they are disposed on or near a longitudinal axis of the vehicle 12. The rear camera 66 may also function as a reverse or back-up camera for assisting a driver while in reverse. In another embodiment, instead of one, middle front camera 64, the vehicle 12 may include two front cameras 64, with one located on or near each side of the vehicle 12. For example, one front camera 64 may be located near each headlight of the vehicle (e.g., above or below). The cameras 62 may be exterior-facing or perimeter cameras such that they face outward from the vehicle 12 and not into or beneath/under the vehicle 12.

As a result of the one or more cameras 62, a field of view around the vehicle 12 may be provided to the driver. The cameras 62 may provide a field of view that includes the front, rear, and/or side(s) of the vehicle. In one embodiment, a 360° or substantially 360° view of the area surrounding the vehicle 12 may be provided to the driver. The images or video from the cameras 62 may be provided to the driver via the display 60 (or to a plurality of displays 60 in the vehicle). In another embodiment, the cameras 62 may provide a view covering at least 180° of the vehicle 12, such as at least the front or at least the rear half of the vehicle 12. In at least one embodiment, the cameras 62 are visible-light cameras. However, it is also contemplated that the cameras 62 may sense light in other spectrums, such as infrared.

With reference to FIGS. 2A-2D, an imaging and object recognition system 100 is described. The system may be used, for example, to assist a driver in locating a transmit coil 40 and to position the receive coil 34 of the vehicle 12 over the transmit coil 40 to charge the traction battery 24 of the vehicle. FIGS. 2A-2D show an embodiment of a superimposed or augmented image stream 102 that may be presented on one or more displays 60 in the vehicle 12. The term "image stream" is used herein to describe still images, a series of still images, streaming video, or any other type of visual information that may come from a camera. The source of the image stream may come from one or more of the cameras 62 installed or coupled to the vehicle 12. The augmented image stream 102 may include the source stream with additional symbols, indicators, text, images, or other visual information not provided in the source stream added thereto.

As described above, the cameras 62 may provide a 360° view around the vehicle 12, as shown in FIGS. 2A-2D. The source stream may include image feeds from one or more cameras 62 that have been combined to form a single stream. The image feeds from the camera(s) 62 may be received and processed by a controller, such as controller 48 or another controller within the system 100 (e.g., a dedicated entertainment/navigation controller), and delivered to the display 60. The controller may then process the image stream and add visual information to form the augmented image stream 102. The augmented image stream 102 is shown with the vehicle 12 traveling left to right, however, the stream may show the vehicle 12 traveling in any direction. For example, if the vehicle 12 is in "drive," the stream 102 may show the vehicle 12 oriented vertically and traveling in an upward direction. If the vehicle 12 is in "reverse," the stream 102 may show the vehicle 12 oriented vertically and traveling in a downward direction. Further, the field of view in the combined video stream may be manipulated and projected onto a flat surface to resemble a top-down view or projected onto a different 3-D surface to give a bird's eye or other augmented perspective to the vehicle surround.

In at least one embodiment, the augmented image stream 102 may include a symbol or virtual representation 104 of the vehicle 12. The augmented stream 102 may locate the symbol 104 in the current location of the vehicle 12 within the 360° view around the vehicle 12 provided by the cameras 62. The symbol 104 may further include a symbol or virtual representation 106 of the receive coil 34. The symbol 104 of the vehicle 12 may have any suitable shape. For example, the symbol 104 may be a rectangle or it may be an outline corresponding to the shape of the vehicle 12. In one embodiment, shown in FIGS. 2A-2D, the symbol 104 is a simplified top-view of the vehicle 12. The symbol 106 may have any shape, which may or may not be visually similar to the actual receive coil 34. For example, the symbol 106 may be a square or rectangle having a size that is proportional or substantially proportional to the size of the symbol 104 of the vehicle 12. A square or rectangle may represent the casing or housing of the receive coil 34. In one embodiment, the symbol 106 may be a circle, which may represent the shape of the receive coil 34 inside its casing or housing. The symbol 106 may be located in a location on the symbol 104 that corresponds to the location of the receive coil 34 on the vehicle 12 in a top-view.

In addition to generating the augmented image stream 102, the imaging and object recognition system 100 may also detect and recognize objects in the image streams from the cameras 62. Parameters used to extract object data from the image stream may include one or a combination of color channel filtering, edge detection within the image leveraging processes such as image gradient calculation, and use of algorithms such as the Hough Transform for skew estimation. These are only several possible methods of extracting object data, and other methods known in the art may be used. For example, other methods or approaches may include tracking infrared light or other emitted signal(s) from the target to track it against a non-emitting background. The system 100 may detect and recognize the transmit coil 40 and/or a target 108 in the image streams from the cameras 62. The target 108 may be a two-dimensional or three-dimensional image or object that is located with a predefined relationship to the transmit coil 40. In one embodiment, the target 108 may be a two-dimensional image that is applied to the ground or surface near the transmit coil 40. For example, the target may be painted, drawn, etched, carved, stamped, or otherwise applied to the ground or surface. The target may also be applied as a sticker. The target 108 may be placed, for example, behind the coil 40, in front of the coil 40, next to the coil 40, or in any other known location. As used herein, "behind/in front/next to" are relative to a vehicle 12 approaching the coil 40. The target 108 may also be a three-dimensional object, such as a sign or a free-standing object. The target 108 may be a sign that has the same shape as the two-dimensional target described above. Similar to the above, the three-dimensional target may be placed, for example, behind the coil 40, in front of the coil 40, next to the coil 40, or in any other known location.

The target 108 may be located in a predefined or known location relative to the transmit coil 40. For example, a two-dimensional target 108 may be located one meter directly behind the coil 40, measured from a center point of the target 108 and the coil 40. Alternatively, a three-dimensional target 108 may be located one meter behind and one meter above the coil 40, also measured from their center points. These are merely examples, however, and the target 108 and the coil 40 may have any spatial relationship. The system 100 may have the size, shape, and dimensions of the target 108 stored in memory, as well as the spatial relationship between the target 108 and the coil 40. Accordingly, once the target 108 is detected and recognized by the system 100, the system 100 can calculate or determine the location of the coil 40 relative to the target 108 based on the known spatial relationship therebetween. The size, shape, and dimensions of the target 108, as well as the spatial relationship between the target 108 and the coil 40 may also be stored in memory located in the transmit coil 40 or its housing. The coil, or electronics coupled or associated therewith (e.g., within a case or enclosure surrounding the coil) may transmit information related to the size, shape, and dimensions of the target 108 and the spatial relationship between the target 108 and the coil 40 to the vehicle 12. This may allow the vehicle 12 to have no previously stored information or knowledge of the target 108 or its spatial relationship to the transmit coil 40. Transmission of the information may be performed over any known wireless protocol, such as wifi, Bluetooth, NFC, or others.

In addition to detecting and recognizing the coil 40 and/or target 108, the system 100 may also highlight or otherwise draw attention to the coil 40 and/or target 108. In one embodiment, the system may highlight the coil 40 and/or target 108 by surrounding them with an indicator. The indicator may have the same or substantially the same shape as the coil 40 and/or target 108 or it may have the same shape but slightly larger. For example, in FIG. 2A, the coil 40 has a rectangular shape and the indicator 110 surrounding it also has a rectangular shape, but slightly larger. The target 108 in FIG. 2A has a "T" shape and the indicator 112 surrounding it has the same shape, but slightly larger. Similar to the symbols 104 and 106, the indicators 110 and/or 112 may be added to the image stream in the augmented image stream 102. The indicators may have a color or pattern that makes them stand out against the background of the stream or they may blink, flash, or otherwise draw attention to themselves. The indicators 110 and 112 are not required, however, and FIG. 2B shows the augmented image stream 102 without the indicator 112 for the target 108. The indicators may assist the driver in locating the coil 40 and/or target 108 and facilitate the positioning of the vehicle 12 over the coil 40.

Figure 2A:
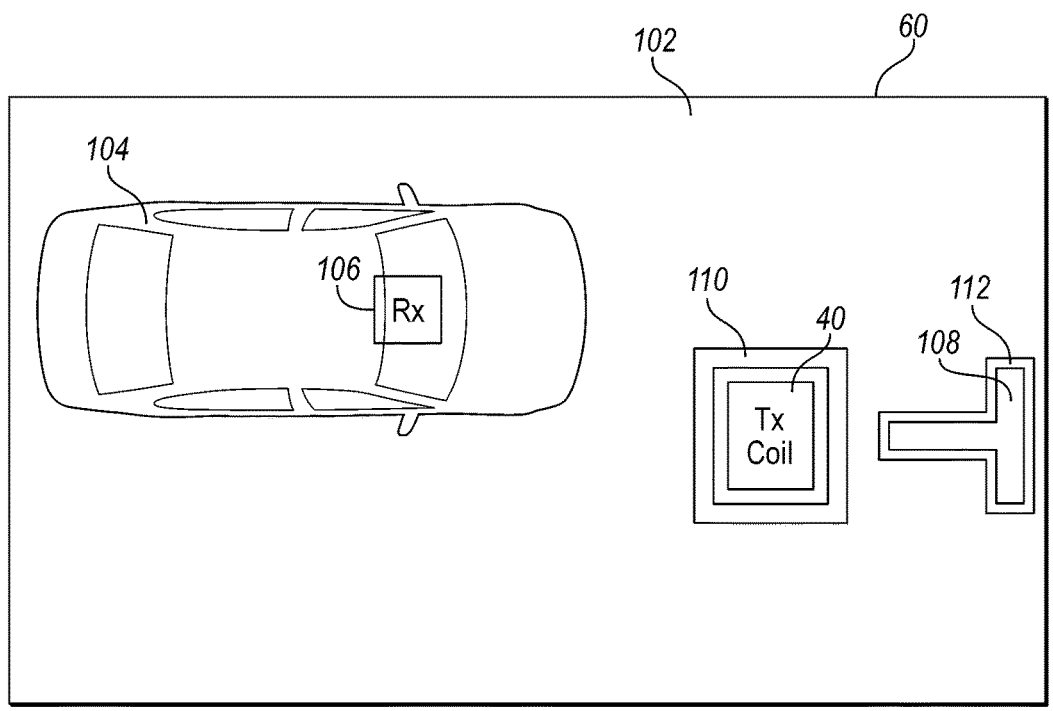
FIG. 2A shows a schematic example of an augmented image stream provided to a vehicle display during a parking event at time 1.
Figure 2B:
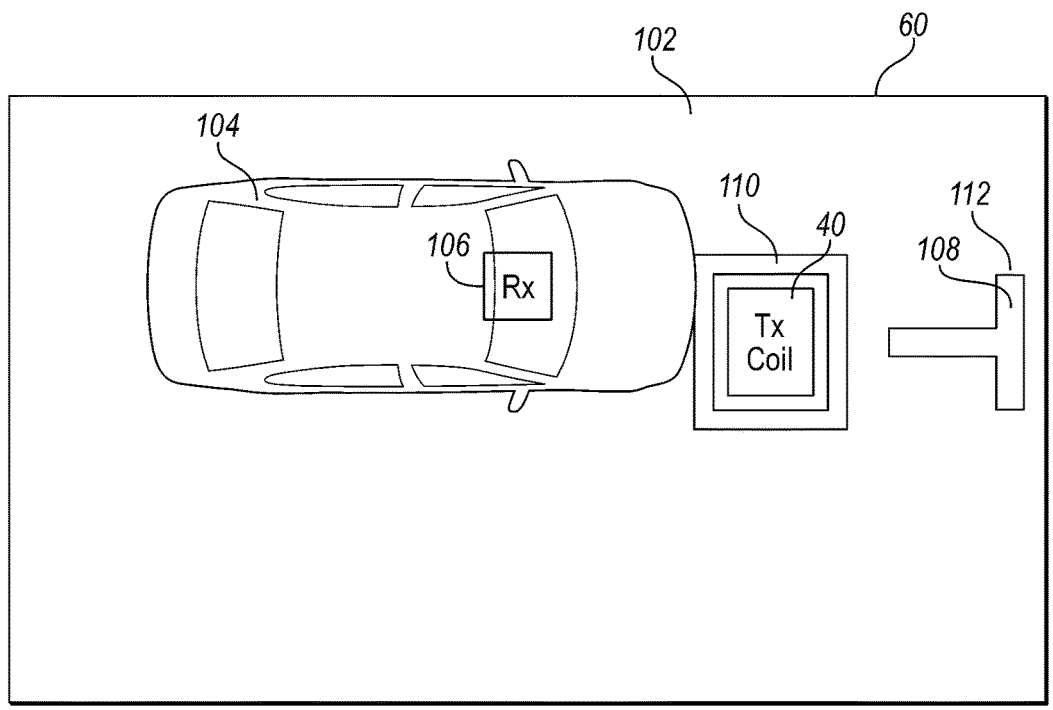
FIG. 2B shows a schematic example of an augmented image stream provided to a vehicle display during a parking event at time 2.

FIGS. 2A-2D show an example of the augmented image stream 102 that a driver of the vehicle 12 may see while attempting to park the vehicle 12 over the coil 40. In FIG. 2A, the stream 102 shows the vehicle symbol 104 and the receive coil symbol 106, as well as the area surrounding the vehicle 12. The transmit coil 40 can be seen in the images from the cameras 62 and is also highlighted by indicator 110. In addition, the target 108 can be seen in the images from the cameras 62 and is also highlighted by the indicator 112. As the vehicle 12 gets approaches the coil 40 and gets closer, as shown in FIG. 2B, the transmit coil 40 is still in view of the cameras 62 and is still highlighted by indicator 110. In the example shown in FIG. 2B, indicator 112 is not present, however, indicators 110 and/or 112 may be included or not included during any stage of the vehicle positioning process.

Figure 2C:
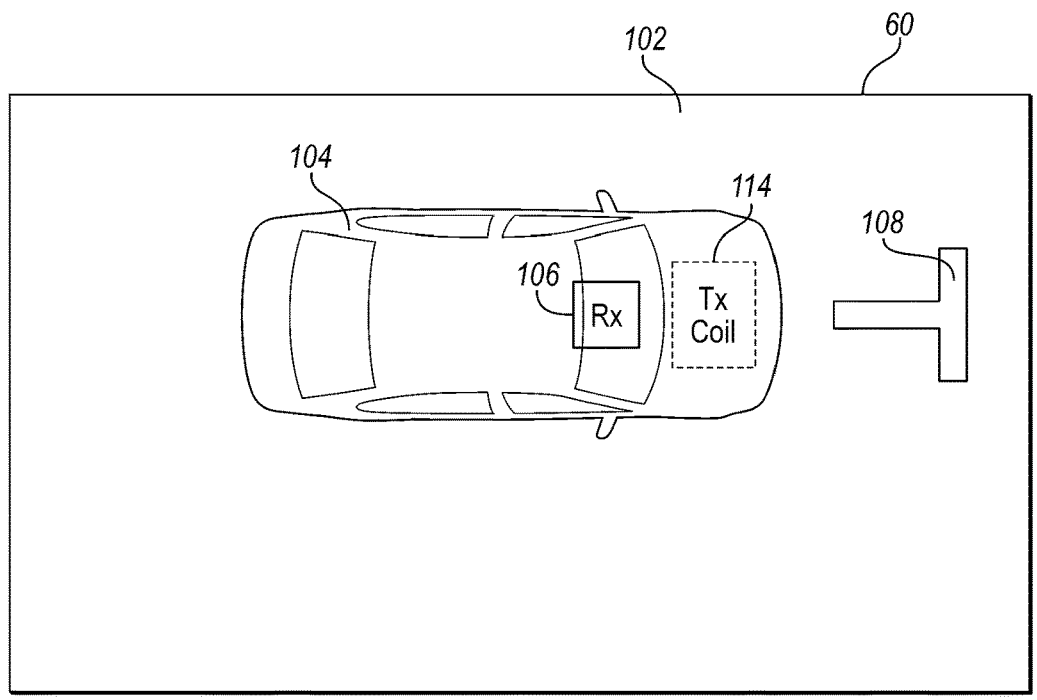
FIG. 2C shows a schematic example of an augmented image stream provided to a vehicle display during a parking event at time 3.

In FIG. 2C, as the vehicle 12 continues to approach the transmit coil 40, the front of the vehicle extends over and covers at least a portion of the transmit coil 40. At a certain point during the positioning process, the vehicle 12 will cover some or all of the coil 40 such that it is out of view of the cameras 62. At this point, the system 100 may include a symbol or virtual representation 114 of the coil 40 in the augmented stream 102. The symbol 114 may have a shape or image similar to the actual coil 40 or it may have a different shape, for example, the shape used for indicator 110. The symbol 114 may be shown in a different color from the symbol 104 of the vehicle 12 and/or the symbol 106 of the receive coil so that it can be differentiated by the driver. The symbol 114 may also flash or blink, similar to indicators 110 and/or 112. In one embodiment, the symbol 104 of the vehicle may be or may turn translucent once symbol 114 is shown. This may allow the symbol 114 to stick out and be seen more easily. The symbol 114 may also be translucent. In one embodiment, the symbol 106 for the receive coil 34 may remain solid or opaque.

Figure 2D:
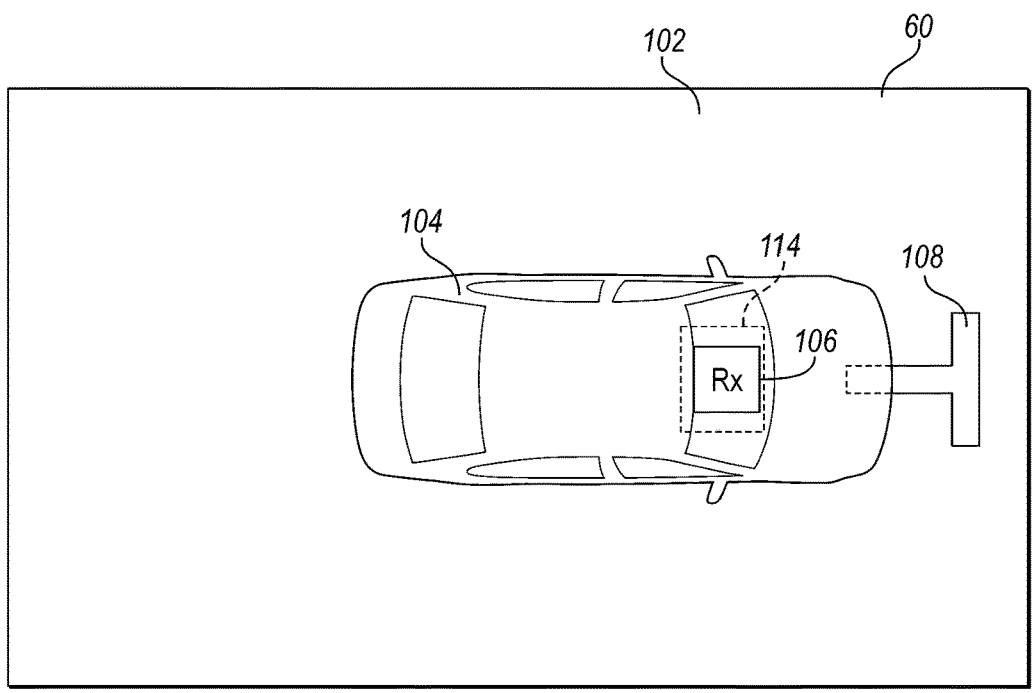
FIG. 2D shows a schematic example of an augmented image stream provided to a vehicle display during a parking event at time 4.

Accordingly, as shown in FIG. 2D, the driver may be able to steer the vehicle 12 such that the symbol 106 for the receive coil 34 lines up or overlaps with the symbol 114 for the receive coil 40. When the symbols 106 and 114 overlap, the coils 34 and 40 are positioned such that wireless charging of the vehicle battery can occur. The symbols 106 and 114 may be sized and shaped such that any charging power can be transmitted or such that at least a certain amount of power can be transmitted. For example, to avoid inefficient charging, the symbols may be sized and shaped such that when they overlap the battery charges at least at 80% of its maximum charging efficiency. The symbols may be configured to ensure any desired charging efficiency, such as at least at 80, 85, 90, 95, 99, or 100% of maximum charging efficiency.

The symbols/indicators may be generated based on the detected and recognized position of the transmit coil 40 itself and/or the detected and recognized position of the target 108. In at least one embodiment, the indicator 110, indicator 112, and/or the symbol 114 may be generated based on the detected and recognized position of the target 108. As described above, the target 108 may be a two-dimensional or three-dimensional image or object that is located with a predefined relationship to the transmit coil 40. When the vehicle 12 approaches the transmit coil 40 and target 108, the target may be seen by one or more of the cameras 62. For example, if approaching in a forward direction, at least one forward camera 64 may see the target 108. If approaching in a rearward direction (e.g., "backing in"), at least one rear camera 66 may see the target 108.

The cameras 62 and/or a controller connected to the cameras 62 may be configured to detect and recognize the target 108. The detection and recognition may be performed using learning algorithms. Learning algorithms may analyze a plurality of images of the target 108 from multiple angles, distances, and levels of illumination against different backgrounds in order to "learn" to detect and recognize the target 108 from new images or video streams presented to the system 100 later on. The system may also calculate/determine the distance and relative position of the target 108 from the vehicle 12 based on the detection and recognition, or by leveraging the object detection schemes described previously. Multiple different targets 108 may be analyzed and "learned" by the algorithms such that the system 100 may detect and recognize more than one target 108 shape or size. As described above, the target 108 may have any shape, such as a "T" shape, a rectangle, triangle, star, arrow, or other shapes (examples shown in FIGS. 4A-4D). The target 108 may also have any suitable size. In addition to size and shape, the target 108 may be or include any color or pattern. The color or pattern may further assist the learning algorithm in detecting and recognizing the target 108. Training methods known in the art may be used to identify the target 108 in the camera field of view. Methods used might include cascaded Haar-like features to identify a given target similar to the Viola-Jones algorithm for face and object detection.

In addition to detecting and recognizing the target 108, the system 100 may also have stored therein (e.g., in the controller or other accessible memory) information regarding the relative position between the target 108 and the transmit coil 40. This information may be in two dimensions or three dimensions, depending on the type of target 108 used. For example, if the target 108 is painted on a surface that is coplanar (or substantially coplanar) with the coil 40, a two-dimensional relative position may be stored, while if the target 108 is on a sign that is in front of the coil 40, a three-dimensional relative position may be stored. The relative position may be stored using a Cartesian coordinate system, such as an X-Y-Z coordinate system with X and Y serving as horizontal axes and Z serving as a vertical axis. For example, if the target 108 is painted on a surface one meter directly in front of the coil 40, the relative position may be stored with a zero for the X-axis (left-right) and a one for the Y-axis. Since the target 108 is generally in the same plane as the coil 40, the Z-axis value would be zero. If the target 108 was on a one meter tall sign, the Z-axis value would be one. While Cartesian coordinates are used in the examples, other coordinate systems may also be used (e.g., polar).

Accordingly, the system 100 is able to detect and recognize the target 108 when it is seen by one or more of the cameras 62. The system 100 also has stored therein the relative position of the target 108 to the transmit coil 40. Based on the recognition of the target 108 and its known relative position to the coil 40, the position of the coil 40 can be calculated by the system 100 (e.g., by one or more controllers therein) and the indicator 110 and/or symbol 114 can be generated and included in the augmented stream 102.

Generation of symbol 114 based on recognition of the target 108 may be particularly advantageous when the vehicle 12 is close enough to the transmit coil 40 that the coil is no longer in view of the driver and/or the cameras 62, examples of which are shown in FIGS. 2C-2D. Once the coil 40 is out of view of the cameras 62, optical detection and recognition of the coil 40 cannot be performed. However, since the target 108 is still within view of the cameras 62 and the relative position between the target 108 and the coil 40 is known by the system 100, the symbol 114 may be generated and included in the augmented stream 102 even when the vehicle 12 is covering some or all of the coil 40. For example, by combining the skew estimation, location, and magnification of the target in the camera field of view (FoV), the system may have enough information to calculate the real-world position of the target 108 and, based on system calibration, can then draw a representation of the transmit coil 40 even as the vehicle 12 has driven over the top of the transmit coil 40, obscuring its view. This may better enable a user to guide the vehicle 12 toward an optimal final alignment.

Figure 3:
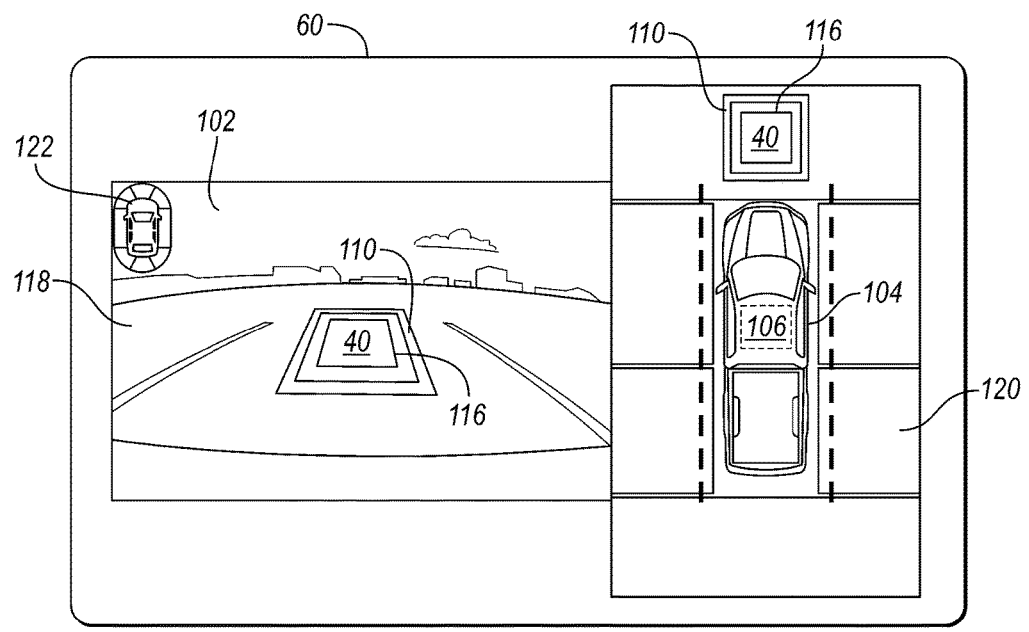
FIG. 3 is a schematic example of an augmented image stream provided to a vehicle display, including a split screen showing two different views, according to an embodiment.

In addition to, or instead of, generating indicator 110 and/or symbol 114 based on detection and recognition of a target 108, the indicator 110 and/or symbol 114 may be generated based on detection and recognition of the coil 40 itself. Examples of an augmented stream 102 based on detection and recognition of the coil 40 are shown in FIGS. 3 and 4. The coil 40 may be detected and recognized in a manner similar to the target 108 described above, such as by using learning algorithms. The coil 40 may generally be included in a protective case or enclosure 116. The case 116 may have any shape, such as a rectangular prism or cylinder. Since the case 116 may have a shape that is similar to shapes encountered while driving the vehicle 12, additional identifying elements may be included in/on or attached to the case to improve detection and recognition. For example, symbols may be included on the exposed surface(s) of the case, which may be unique or easily identifiable, such as stars, emblems, logos, etc. The symbols may also have colors that are different from the case or they may emit light (e.g., visible, UV, infrared, or others) that may be detected by the system 100 (e.g., by cameras 62 or other sensors configured to detect the light).

Similar to the target 10, the dimensions (e.g., size and shape) of the coil 40 and/or its case 116 may be stored in the system 100. Accordingly, the system 100 may detect and recognize the coil 40. Based on the known size and shape of the coil 40, the indicator 110 and/or symbol 114 may be generated and added to the augmented stream 102. This process may be performed in addition to the generation based on the detection/recognition of the target 108. However, as described above, when the vehicle 12 gets close to the coil 40, at a certain point the coil 40 may fall out of the field of view of the camera(s) 62. At this point, if there is no target 108 to base the calculations on, then another method or approach is needed to generate at least the symbol 114 in the augmented stream 102.

In at least one embodiment, the symbol 114 may be generated during at least a portion of the augmented stream 102 using a process known as position estimation (also known as "dead reckoning"). In general, position estimation includes calculating a current position using a previously determined position, and/or advancing a position, based upon known or estimated speeds and course/direction. Stated another way, a current position may be extrapolated from a previous known position and the speed and direction of movement between the previous position and the current position. Similarly, a future position may be extrapolated based on a known current position and the speed and direction of movement between the current and future position.

Transmit coil position estimation may be used once the initial symbol 114 is placed in the augmented stream 102 by using the last known position of the vehicle 12 and/or the coil 40, as well as the speed and course/direction of the vehicle 12. The system 100 may record the relative position between the vehicle 12 and the coil 40 while the coil 40 is in view of one or more of the cameras 62. When the vehicle 12 gets close enough to the coil 40 such that the coil 40 is obstructed, the system 100 may uses the vehicle's speed and direction to generate the symbol 114 without direct detection of the coil 40. The vehicle speed may be determined in any suitable way. In one embodiment, the vehicle 12 may include an anti-lock brake system (ABS), which may monitor the number of rotations of one or more wheels on the vehicle 12. Using the size of the wheels/tires of the vehicle, the system 100 (or other controller in the vehicle 12) may calculate the speed of the vehicle. The speed may also be determined from other methods, such as using a GPS system. The vehicle course or direction may be determined using any suitable method. For example, the steering wheel position may be monitored and used to determine vehicle direction.

Accordingly, using the last known position (or any previously known position) of the vehicle relative 12 to the coil 40 (which may be determined using the detection/recognition methods described above), the system 100 may generate, or continue to generate, symbol 114 in the augmented stream 102 without directly viewing the coil 40. By tapping into the vehicle's speed and direction information, which the vehicle may constantly monitor, the system 100 may continuously generate the symbol 114 as the vehicle 12 moves to position the receive coil 34 over the transmit coil 40.

FIGS. 2A-2D and 3 show several embodiments of the augmented image stream 102 which may be shown to the driver on one or more display 60 in the vehicle 12. As described above, FIGS. 2A-2D show the vehicle 12 moving left to right in an overhead view. FIG. 3 shows an image stream 102 that is split into two views, a front-facing view 118 and an overhead view 120. As described above, the camera(s) 62 may be used to generate a large field of view around the vehicle 12, such as at least 180° or about 360°. However, the camera(s) 62 may also be used to show a front, rear, or side view from the vehicle 12. This view may be similar to rear-facing "back-up" cameras that assist in parking and/or avoid collisions while in reverse.

As shown in FIG. 3, the image stream 102 may be split into a front-facing view 118 and an overhead view 120 in order to provide multiple views to assist the driver. In the embodiment shown, the front-facing view 118 is on the left and the overhead view 120 is on the right of the image stream 102. However, the views may be flipped or a different split may be shown, such as with one view on top and the other on bottom or a diagonal split. In addition, the image stream 102 may switch from a single view to a split view (and back again) based on user preference or based on factors such as the direction of the vehicle (e.g., forward or reverse), speed of the vehicle, distance to the target 108 and/or coil 40, or others. In the embodiment, shown in FIG. 3, an indicator 122 is added to the augmented stream 102 to shown which camera(s) 62 are providing the view 118 (the front camera(s) 64, in this case) or what direction the view 118 is showing.

Figure 4A:
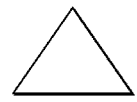
FIG. 4A is an example of a shape that may be used for a target associated with a wireless energy transmit coil.
Figure 4B:
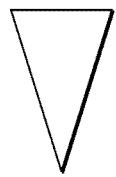
FIG. 4B is an example of a shape that may be used for a target associated with a wireless energy transmit coil.
Figure 4C:
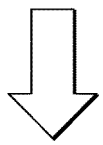
FIG. 4C is an example of a shape that may be used for a target associated with a wireless energy transmit coil.
Figure 4D:
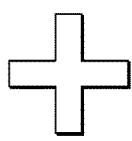
FIG. 4D is an example of a shape that may be used for a target associated with a wireless energy transmit coil.

With reference to FIGS. 4A-4D, non-limiting examples of suitable shapes for the target 108 are shown. These shapes are merely examples, and any shape may be used that can be detected and recognized by the system 100. The examples shown are for a two-dimensional or substantially flat target 108, such as one applied to a surface in front of, behind, or next to the transmit coil 40. In FIGS. 4A and 4B, the target is shown as a triangle. FIG. 4A shows an equilateral triangle 202, while FIG. 4B shows an isosceles triangle 204. Other triangle shapes could also be used, such as a right triangle or a triangle including an obtuse angle. FIG. 4C shows an example of an arrow-shaped target 206. FIG. 4D shows an example of a cross-shaped or "plus sign" shaped target 208. As described above, the target 108 may have one or more colors and/or patterns that cause it to stand out to the driver and/or to the detection and recognition system 100.

While the imaging and object recognition system 100 is described with respect to assisting a driver in locating a transmit coil 40 and positioning the receive coil 34 of the vehicle 12 over the transmit coil 40, it may be used in any locating and positioning application. For example, the system 100 may be used in other vehicle applications, such as in detecting and recognizing parking spots, wired EV chargers, or other items. The system 100 may assist in pulling up to or backing up to items to be towed, such as locating and positioning a vehicle trailer hitch for attaching to a trailer. The system 100 may also be used for non-vehicle applications.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a video camera configured to provide an image stream of an area outside a vehicle footprint; and
a controller configured to receive the stream and a predetermined relative position between a target and a transmit coil wirelessly from the transmit coil, augment the stream with receive and transmit coil symbols representing positions of respective transmit and receive coils based on the target and the position to generate an augmented stream for display.

2. The vehicle of claim 1, wherein when the receive coil symbol overlaps with the transmit coil symbol in the augmented stream, the receive coil is aligned to receive wireless energy from the transmit coil.

3. The vehicle of claim 1, wherein the predetermined relative position between the target and the transmit coil is received within a data set associated with the transmit coil while the transmit coil is within a field of view of the video camera.

4. The vehicle of claim 1, wherein the position of the transmit coil is based on a detection of the transmit coil in the stream.

5. The vehicle of claim 1, wherein the position of the transmit coil is based on a first data set when the transmit coil is within a field of view of the video camera and a second data set when the transmit coil is out of the field of view of the video camera;
the first data set including a relative position between the vehicle and the transmit coil based on a detection of the transmit coil in the stream; and
the second data set including vehicle speed and direction data.

6. A method of positioning a vehicle, comprising:
generating an image stream of an area outside a footprint of the vehicle from visible-light vehicle video cameras;
augmenting the image stream with a receive coil symbol and a transmit coil symbol based on a target detected in the stream and defined received predetermined relative position between a target and a transmit coil wirelessly from the transmit coil defined according to a data set associated with the transmit coil while the transmit coil is within a field of view of at least one of the visible-light vehicle video cameras; and
operating the vehicle such that the receive coil symbol overlaps with the transmit coil symbol.

7. The method of claim 6, wherein the augmented image stream further includes a vehicle symbol representing a position of the vehicle and the receive coil symbol is located within the vehicle symbol.

8. The method of claim 6, wherein the receive coil symbol represents a position of the receive coil and the transmit coil symbol represents a position of the transmit coil.

9. The method of claim 8 further comprising operating the vehicle such that the receive coil symbol overlaps with the transmit coil symbol in the augmented image stream.

10. The method of claim 6, wherein the position of the transmit coil is based on a predetermined relative position between the target and the transmit coil.

11. The method of claim 8 further comprising detecting the transmit coil in the image stream and basing the position of the transmit coil on the detection.

12. The method of claim 8 further comprising basing the position of the transmit coil on a first data set when the transmit coil is within a field of view of the at least one of the visible-light vehicle video cameras and a second data set when the transmit coil is out of the field of view of the visible-light vehicle video cameras or obscured by other objects within the field of view;
the first data set including a relative position between the vehicle and the transmit coil based on a detection of the transmit coil in the image stream; and
the second data set including vehicle speed and direction data.

13. A system for positioning a vehicle, comprising:
one or more visible-light video cameras configured to provide a stream of camera images of an area outside a footprint of the vehicle;
a controller configured to receive the stream from the one or more cameras, augment the stream with a vehicle receive coil positioning symbol, a transmit coil positioning symbol, and a vehicle positioning symbol based on a target in the stream and predetermined relative position data between a target and a transmit coil received wirelessly from the transmit coil to generate an augmented stream, and transmit the augmented stream to a vehicle display; and
the receive coil positioning symbol being located within the vehicle positioning symbol.

14. The system of claim 13, wherein when the vehicle receive coil positioning symbol overlaps with the transmit coil positioning symbol in the augmented stream, a vehicle wireless energy receive coil is aligned to receive wireless energy from a transmit coil at 90% or greater of maximum charging efficiency.

* * * * *